United States Patent [19]

Sayre, II

[11] Patent Number: 4,969,186
[45] Date of Patent: Nov. 6, 1990

[54] TELEPHONE MESSAGE WAITING SYSTEM AND APPARATUS

[75] Inventor: John M. Sayre, II, Indianapolis, Ind.

[73] Assignee: GTE North Incorporated, Westfield, Ind.

[21] Appl. No.: 459,008

[22] Filed: Dec. 29, 1989

Related U.S. Application Data

[63] Continuation of Ser. No. 192,976, May 12, 1988, abandoned.

[51] Int. Cl.⁵ .................... H04M 3/42; H04M 1/00
[52] U.S. Cl. .................... 379/376; 379/201; 379/418; 379/253
[58] Field of Search ............... 379/252, 251, 253, 255, 379/254, 373, 375, 376, 96, 179, 199, 418, 211, 69, 48, 49, 201

[56] References Cited

U.S. PATENT DOCUMENTS

| | | | |
|---|---|---|---|
| 4,477,697 | 10/1984 | Judd et al. | 379/252 X |
| 4,508,937 | 4/1985 | Burger et al. | 379/373 X |
| 4,670,628 | 6/1987 | Boratgis et al. | 379/69 |
| 4,670,900 | 6/1987 | Waldman | 379/211 |
| 4,701,949 | 10/1987 | Lynch et al. | 379/179 |
| 4,747,129 | 5/1988 | Ostrowiecki | 379/199 |

Primary Examiner—James L. Dwyer
Attorney, Agent, or Firm—J. Stephen Yeo

[57] ABSTRACT

A system transmits information over telephone lines using ring signals. The ring signals have bursts of selectable duration separated by selectable time intervals between bursts. A ring signal translator receives the ring signals from telephone lines whereupon a computer activates selected indicators in response to the particular ring signal.

2 Claims, 4 Drawing Sheets

4,969,186

TELEPHONE MESSAGE WAITING SYSTEM AND APPARATUS

This is a continuation of copending application Ser. No. 192976, filed on May 12, 1988, now abandoned.

RELATED COPENDING APPLICATION

Ser. No. 07/110752, filed Oct. 20, 1987 for Telephone Call Indicator by Joseph W. Magnusson, is concerned with apparatus which indicates the occurrence of a ring signal.

BACKGROUND OF THE INVENTION

This invention pertains to telephone message waiting lamps, and more particularly, is concerned with systems and apparatus for indicating a message is waiting.

A number of systems have been proposed for indicating that a message is waiting at a remote location. For example, Schmidt et al. in U.S. Pat. No. 4,506,115, Call Message Alert System, describes a message waiting lamp which flashes in response to a modulated out of band signal sent on ring and tip wires to a telephone handset.

Magnusson in the aforecited pending patent application describes a circuit which latches a lamp on once an ordinary ring signal has been detected.

These arrangements serve their purpose of indicating that a message is waiting or that a call was attempted, but do not have the capacity to provide additional features such as call forward.

It is desirable to provide a system and apparatus which, in adjunct with existing equipment and lines, provides information which may be pertinent to a stored message.

SUMMARY OF THE INVENTION

Briefly, according to one aspect of the invention, there is provided a system for transmitting information over telephone lines by means of ring signals. A ring signal translator receives the ring signals from telephone lines, whereupon a computer activates selected indicators in response to the particular ring signal.

DETAILED DESCRIPTION OF THE INVENTION

Figure 1:
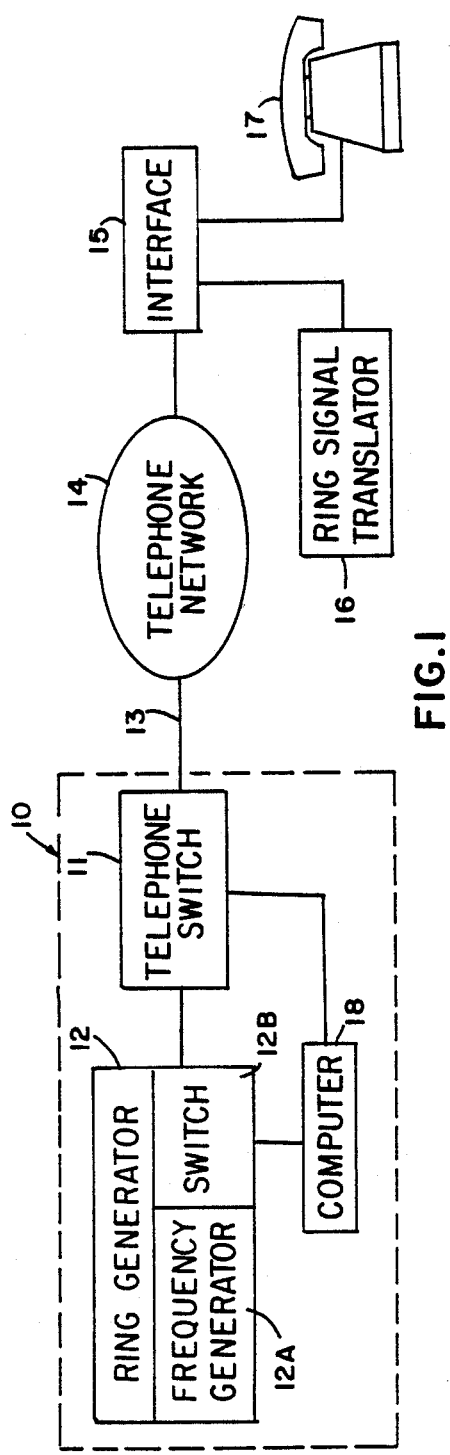
FIG. 1 is a block diagram of a message system embodying aspects of the invention.

Referring to FIG. 1, there is seen a message system embodying the invention. The system allows selected information to be transmitted by telephone ring signals over telephone lines to indicating means. Ring signals includes bursts of 110 volt sinusoids of 20-30 hertz and other common carrier ringing frequencies sent through telephone lines, and are intended to activate the familiar ringer of a handset.

A transmitting facility 10, which typically is either a telephone company's central office or a private branch exchange, has a telephone switch 11 which couples a ring generator 12 to a telephone line 13. The line 13, passes through a telephone network 14 to terminate at a network interface 15. A ring signal translator 16 is connected to interface 15. A telephone handset 17 may be connected in parallel to the ring signal translator 16. When telephone 17 is in active use, the line status is called off-hook. When telephone 17 is in standby, awaiting a call, the line status is called "onhook".

Figure 2:
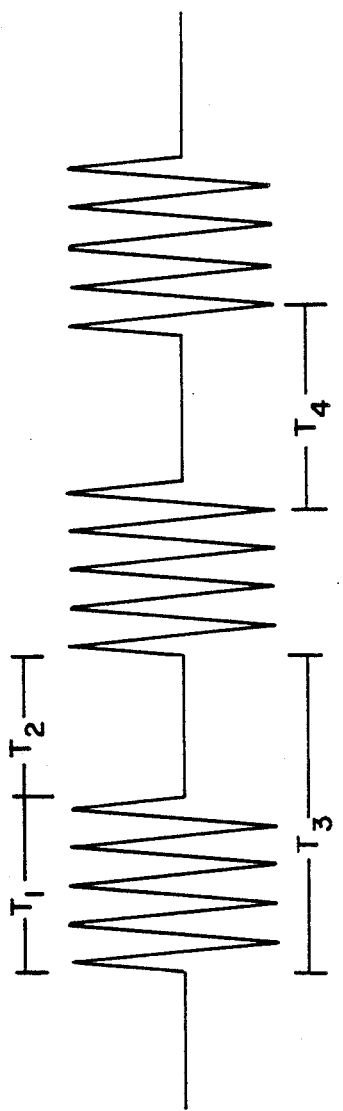
FIG. 2 illustrates segments of a ring signal sent by the system.

Ring generator 12 is arranged to provide one or more ring bursts of duration T1 as seen in FIG. 2. A time interval between bursts (i.e. silence) is T2. Ring cycle T3 is the sum of T1 and T2. Time variables T1 and T2 are typically a few seconds long. By making multiple calls, bursts may be separated by a longer time interval, T4. In one embodiment of the invention, T1 and T2 are selected in accordance with a predetermined ring code to signify information, which may pertain to stored messages.

Returning to FIG. 1, the selection of a ring code may be performed by a central computer 18. Computer 18 may also store messages and generate a dialing sequence to switch 11 to link ring generator 12 to the ring translator 16. Ring generator includes a frequency generator 12A and control switch 12B.

The particular code and corresponding information are chosen for the application. As way of example only, Table 1 shows a sample code, where in the duration T1 and T2 represent information.

TABLE 1

| T1 | T2 | Indicator States |
|---|---|---|
| 4 sec | 2 sec | Message Waiting |
| 3 sec | 3 sec | Alarm |
| 1 sec | 5 sec | Call Main Office |
| 2 sec | 4 sec | No Message (Regular Ring Signal) |

Multiple calls may also be used to convey information, e.g., two 2 second bursts separated by a 2 minute interval may represent a call forwarding message. Alternately, other ring signal variables, such as number of bursts, may also be used to convey information.

Figure 3:
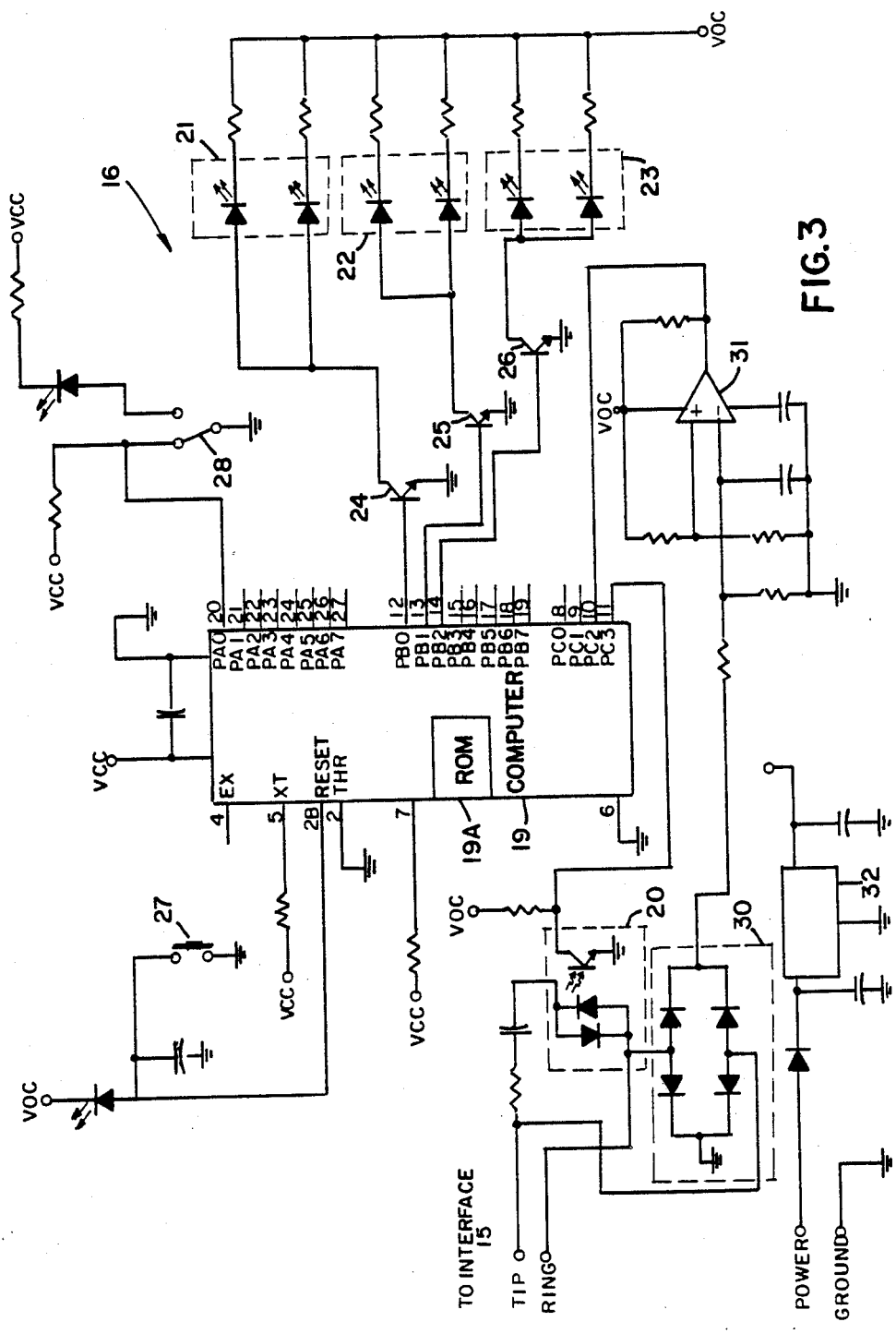
FIG. 3 is a circuit diagram of a ring signal translator embodying further aspects of the invention.

The preferred circuit of ring signal translator 16 is shown in FIG. 3. Values of resistors and capacitors are by way of example only. A translator computer 19 has an input port PC3 coupled to network interface 15 through an optical isolator 20. Computer 19 may be a single chip microprocessor, such as a Motorola 68705P3. Computer 19 has a plurality of latching port outputs, PB0, PB1, and PB2, coupled to one or more indicators. In the circuit shown, the indicators are LED's (light emitting diodes) arranged in pairs 21, 22, and 23 and coupled to their corresponding latching ports PB0, PB1, and PB2 through switching transistors 24, 25, and 26. When a port is latched, a current path is completed, activating the corresponding indicator.

Computer 19 measures the variables of any received ring signal and is programmed by ROM 19A to activate one or more indicators 21, 22, and 23 in accordance with coded ring signals received through the network interface 15. Table 2 shows an example of indicator states when T1 and T2 are the variables as in Table 1.

TABLE 2

| T1 | T2 | Indicator States |
|---|---|---|
| 4 sec | 2 sec | 21, 22 and 23 ON |
| 3 sec | 3 sec | 22 ON, 21 and 23 OFF |
| 1 sec | 5 sec | 23 ON, 22 and 23 OFF |
| 2 sec | 4 sec | 21, 22, and 23 OFF |

Momentary contact switch 27 is coupled to a reset port, RESET, on the microcomputer 19. When switch 27 is closed any latched ports are released and the corresponding indicators are deactivated. Zero voltage is normally maintained at control port PAO. A SPDT switch 28 allows voltage to be applied to port PAO for changing the interpretation of the ring signal code in call forwarding mode.

The system may convey information by the number of ring bursts instead of varying T1 and T2. For example, one ring burst could represent message waiting, while two separate calls of one ring burst each can indicate a call waiting message if call forward switch 28 is set. It is entirely possible, however, that a person will answer a regular call after only one burst. The translator, sensing only one ring burst would, without additional provisions, interpret the one burst as indicating a message waiting signal. Accordingly provision may be made to allow the translator to determine if the telephone 17 of FIG. 1 becomes off-hook.

A full wave rectifier 30, provides a d.c. voltage of correct polarity regularly notwithstanding inadvertent reversal of tip and ring lines. The d.c. voltage is applied to voltage comparator 31, and optionally to voltage regulator 32 which provide voltage $V_{CC}$ to the translator 16. The output of voltage comparator 31 is coupled to port PC2 of computer 19. The presence of a voltage at PC2 is indicative that the line status is "on-hook". When the line status is off-hook, the d.c. voltage at interface 15 drops below the threshold of comparator 31 and the output voltage directed to PC2 is rejected.

Figure 4A:
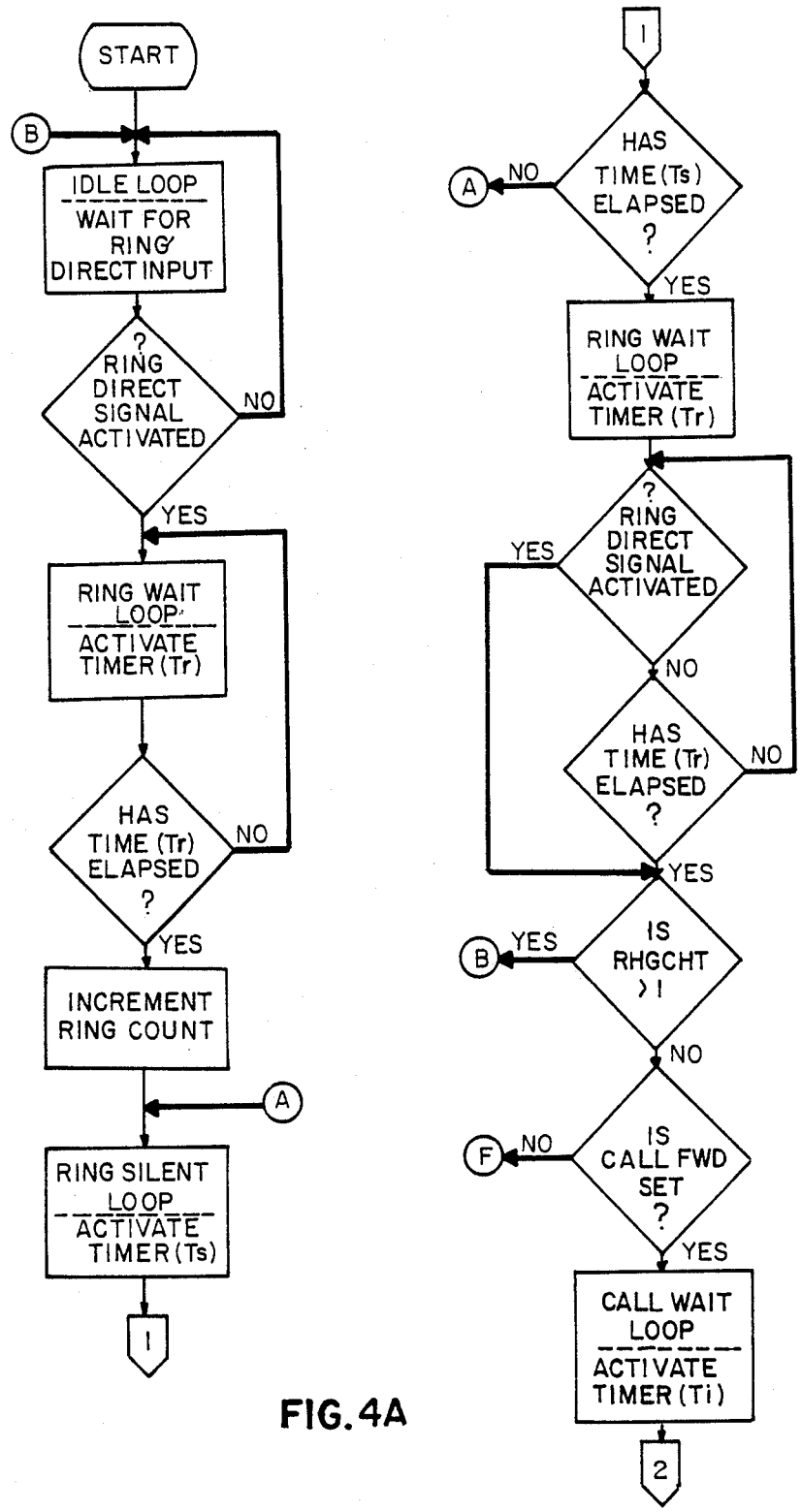
FIG. 4a and 4b is a flow diagram of a computer program used in the ring translator.
Figure 4B:
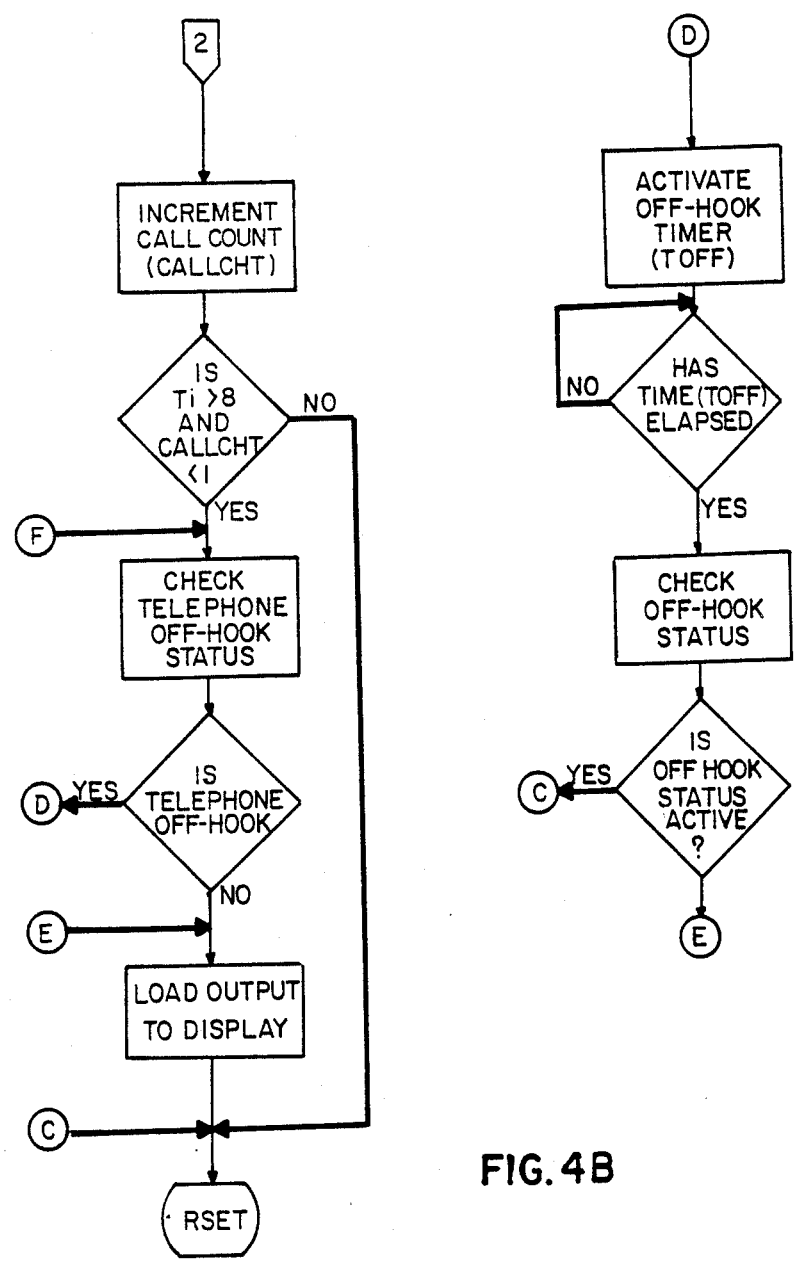

Memory 19A may contain a program utilizing the flow chart of FIG. 4. In the example represented by the flow chart, one burst causes the indicator to signal a message is waiting. Two calls of one burst each cause the indicator to signal a message waiting only if call forward switch 28 is set. If the line becomes off-hook after only one ring burst, the program is interrupted to avoid a false indication that a message is waiting.

Referring to FIG. 4, the program begins after the device has been activated and gone through the power-up/reset subroutine. The program remains in an idle loop until a ring burst is detected. The device is in a low power mode with only the computer 19 consuming power. The translator is designed to detect each ring burst from the local telephone network. Upon detection of a ring burst, the program proceeds to a ring wait loop. The ring wait loop allows the telephone ringer to complete the burst. The duration of a ring burst may be 1.2 seconds out of a 6 second ring cycle. The ring wait loop waits for a time, Tr, of 1.2 to 2.2 seconds to elapse before checking for a second ring burst. After the expiration of Tr, a ring silent loop is activated. The total number of ring bursts, RNGCNT, is to be counted. The ring silent loop represents the time increment, Ts, between ring bursts. This time period ranges between 2.0 to 6.0 seconds out of a total ring cycle (burst and silence) of 6 seconds. After the ring silent, Ts, period has elapsed, the program waits ring wait time interval, Tr, to determine if a second ring signal is being sent. If a second ring signal is detected, the translator interprets this an an incoming call and not a message signal/call forward signal being sent from the Central Messaging Service. If a second ring signal is not detected, it interprets this as notification that a message has been left for the subscriber. If a second ring burst is detected, the program returns to the ring wait loop to allow the second ring to complete the entire ring cycle (ring and silent periods). This loop will continue with the ring counter being incremented until the telephone stops ringing at which time the program is reset.

The translator device determines if a message is waiting for the subscriber by counting the number of telephone ring bursts received during a given call. In the present example, if only one ring burst was received, a message is waiting; if more than one ring burst is received, the call is an actual incoming call and the program is reset. If call forward switch is not set and only one ring signal is received, the indicator is then activated. Activating may be subject to the off-hook routine described below. If call forward switch is set, two ring bursts, each on a separate call, indicates a message is waiting, therefore, the translator will await a second ring signal on a second call for message verification. The translator will wait a time period of Ti (time interval) to receive a second ring burst. If a second ring burst does not occur within that time, the message display will not be activated. If a second ring burst is received on a second call the display is activated. Message count is incremented during the call waiting loop only when a ring burst is received. This allows the computer to administer how many calls have been received during Ti. If less than two have been received during Ti, the program is reset without activating the display. As an additional feature of the invention, the translator checks the status of the local telephone loop to determine if any telephones on that circuit have gone off-hook. This reduces the possibility that a false message indication would be received due to the telephone being taken off-hook after the first ring. If the off-hook status indicates a telephone has been lifted off-hook, the translator will then activate a subroutine to determine if the incoming call was a message indication signal of a completed call. If the off-hook status indicates all telephones are on-hook, the device sets the computer's output ports to drive the indicator display, indicating a message is waiting to be picked up. The program is reset to detect the next incoming ring message.

If it is indicated that a local telephone is off-hook after the first ring burst, it is assumed that the local telephone would be hung up within a period, Toff, if there is not another party on the line. An off-hook status activates a timer program Toff (Time off-hook). If the telephone loop status remains active after Toff has elapsed, the device will interrupt the call as a call from another party and not activate the indicator. If the status changes to an on-hook status, the device will interpret the call as a message indicator signal and activate the light.

The best embodiment and preferred mode of the invention has been described. It will be apparent to 10 those skilled in the art that modifications and variations may be made. The scope of the invention is therefore to be determined by the claims.

What is claimed is:

1. A ring signal translator for a message waiting system adapted to be coupled to a telephone network for receiving ring signals having ring codes signifying information pertaining to stored messages, comprising:
   a computer; and
   indicator means;
   said computer having an input port for detecting said ring signals, and at least one output port coupled to said indicator means, said computer programmed to interpret said ring code and to activate said indicator means to signify information pertaining to stored messages in response to receipt of a selected number of ring bursts;

wherein said telephone network includes a line and said ring signal translator includes means for determining if said line becomes "off-hook" after a selected number of ring bursts are detected and for preventing said indicator to be activated unless said line becomes "on-hook" within a predetermined time period.

2. A ring signal translator for a message waiting system adapted to be coupled to a telephone network for receiving ring signals having ring codes signifying information pertaining to stored messages, comprising:

a computer; and indicator means;

said computer having an input port for detecting said ring signals, and at least one output port coupled to said indicator means, said computer programmed to interpret said ring code and to activate said indicator means to signify information pertaining to stored messages in response to receipt of a selected number of ring bursts; wherein said ring translator includes means for switching to a call forward mode, and said computer programmed to activate said indicator means in response to detection of a selected number of ring bursts during a plurality of calls, and said telephone network includes a line and said ring signal translator includes means for determining if said line becomes "off-hook" after a selected number of ring bursts are detected and for preventing said indicator means to be activated unless said line becomes "on-hook" within a predetermined time period.

* * * * *